US011716933B2

(12) United States Patent
Bonetti (10) Patent No.: US 11,716,933 B2
(45) Date of Patent: Aug. 8, 2023

(54) APPARATUS FOR CHOPPING AND DISCHARGING CROP RESIDUE FROM A COMBINE HARVESTER

(71) Applicant: AGCO DO BRASIL SA LTDA, Ribeireo Preto (BR)

(72) Inventor: Lauro Bonetti, Canoas (BR)

(73) Assignee: AGCO do Brasil Soluções Agrícolas Ltda., Sau Paulo (BR)

( * ) Notice: Subject to any disclaimer, the term of this patent is extended or adjusted under 35 U.S.C. 154(b) by 296 days.

(21) Appl. No.: 16/491,524

(22) PCT Filed: Feb. 19, 2018

(86) PCT No.: PCT/IB2018/000121
§ 371 (c)(1),
(2) Date: Sep. 5, 2019

(87) PCT Pub. No.: WO2018/162974
PCT Pub. Date: Sep. 13, 2018

(65) Prior Publication Data
US 2020/0015419 A1    Jan. 16, 2020

(30) Foreign Application Priority Data
Mar. 6, 2017    (GB) ...................... 1703530

(51) Int. Cl.
*A01D 43/08*    (2006.01)
*A01D 41/12*    (2006.01)
(Continued)

(52) U.S. Cl.
CPC ............. *A01D 45/30* (2013.01); *A01D 41/12* (2013.01); *A01D 41/1243* (2013.01);
(Continued)

(58) Field of Classification Search
CPC .. A01D 41/1243; A01D 43/08; A01D 43/081; A01D 43/10; A01D 82/00;
(Continued)

(56) References Cited

U.S. PATENT DOCUMENTS 3,875,729 A * 4/1975 Partsch .................. A01D 34/49
56/199
4,552,547 A * 11/1985 Carnewal ............... A01D 41/12
474/101
(Continued)

FOREIGN PATENT DOCUMENTS

DE    36 15 151 A1    11/1987
DE    3615151 A1 * 11/1987    ............. A01F 12/40
(Continued)

OTHER PUBLICATIONS

European Patent Office, International Search Report for related International Application No. PCT/IB2018/000121, dated May 14, 2018.

*Primary Examiner* — Alicia Torres
*Assistant Examiner* — Madeline I Runco (57) ABSTRACT

A straw chopper for a combine harvester including a rotor supporting a plurality of chopping elements. A rotor housing including an inlet opening, an outlet axially aligned with the inlet opening, and at least one outlet that is axially offset from the inlet opening. A portion of the straw is conveyed tangentially to the axially-aligned outlet, whilst a further portion is conveyed from the inlet opening to the axially offset outlet(s) via a path having an axial component, for example a helical path. Guide vanes may be provided on the inside of the housing to impart an axial force upon the straw.

15 Claims, 6 Drawing Sheets

(51) Int. Cl.
    *A01F 12/40* (2006.01)
    *A01F 29/12* (2006.01)
    *A01D 45/30* (2006.01)

(52) U.S. Cl.
    CPC .............. *A01D 43/08* (2013.01); *A01F 12/40* (2013.01); *A01F 29/12* (2013.01)

(58) Field of Classification Search
    CPC .. A01D 34/005; A01D 42/005; A01D 34/435; A01D 34/535; A01D 34/736; A01D 34/668; A01D 34/667; A01D 34/71; A01D 34/49; A01F 12/30; A01F 12/40; A01F 29/12; A01F 29/01; A01F 29/02; A01F 29/04; A01F 29/06; A01F 29/09
    See application file for complete search history.

(56) References Cited

U.S. PATENT DOCUMENTS

| | | | |
|---|---|---|---|
| 4,628,946 A | | 12/1986 | De Busscher et al. |
| 4,884,993 A | * | 12/1989 | Hemker ............. A01D 41/1243 460/14 |
| 5,232,405 A | | 8/1993 | Redekop et al. |
| 5,542,883 A | * | 8/1996 | Cruson .................... A01F 12/40 460/112 |
| 6,113,491 A | * | 9/2000 | Holmen .................. A01F 12/40 460/111 |
| 7,404,761 B2 | * | 7/2008 | Dow ....................... A01F 12/40 460/112 |
| 9,345,198 B2 | * | 5/2016 | Pohlmann .............. A01F 29/06 |
| 9,686,916 B2 | * | 6/2017 | Biggerstaff ............. A01F 17/04 |
| 9,723,790 B2 | * | 8/2017 | Berry ..................... A01F 12/00 |
| 2018/0249641 A1 | * | 9/2018 | Lewis .................. A01F 29/025 |

FOREIGN PATENT DOCUMENTS

| | | | | |
|---|---|---|---|---|
| DE | 3438609 C2 | * | 8/1990 | ............. A01F 12/40 |
| EP | 0 331 784 A | | 9/1989 | |
| EP | 1442649 B1 | * | 6/2006 | ............. A01F 12/40 |
| EP | 1716736 A1 | * | 11/2006 | ............. A01F 12/40 |
| EP | 1 754 408 A2 | | 2/2007 | |
| EP | 2181578 A2 | * | 5/2010 | ......... A01D 41/1243 |

* cited by examiner

APPARATUS FOR CHOPPING AND DISCHARGING CROP RESIDUE FROM A COMBINE HARVESTER

FIELD OF INVENTION

The invention relates to apparatus for chopping and discharging crop residue from a combine harvester, the apparatus comprising a rotor supporting a plurality of chopping elements and a rotor housing comprising an inlet opening for receiving crop residue and an outlet for discharging chopped crop residue.

BACKGROUND

It is well known to fit combine harvesters with a straw chopper at the rear of the machine for chopping the residue plant material, hereinafter generalised as "straw", ejected from separating apparatus. Depending on the requirements of the farmer, the straw is either deposited directly onto the ground in windrows for subsequent baling and removal, or chopped and spread onto the field behind the combine for incorporation back in to the soil. Means to direct the straw from the separating rotor either into the chopper or onto the ground typically comprises a pivotable plate which selectively exposes or covers the inlet opening of the chopper respectively.

Known straw choppers generally comprises a rotor in a housing with knives attached to both the rotor and the inside surface of the housing. Straw fed into the housing through an upper opening is conveyed tangentially under the rotor and ejected through a rectangular outlet defined by a cut-out across the width of the rear of the rotor housing.

Today, large combine harvesters typically carry a cutting header which is substantially wider than the vehicle. To ensure even distribution of the nutrient-containing chopped straw, spreading means are positioned downstream of the chopper outlet and which serve to passively or actively propel the material across the full cutting width (corresponding to the width of the header). In a passive arrangement, the chopped straw is propelled by the ejection force of the chopper rotor and guide vanes direct the accelerated material in the desired direction. For larger spreading widths active spreaders comprising driven fans are commonly installed. It goes without saying that active spreaders add more in the way of mechanical moving parts to the machine ultimately adding to the overall cost.

In an aim to improve the ejection speed of the chopped straw from the chopper, air vanes or paddles have been added to the chopper rotor to generate an accelerating airflow. For example, U.S. Pat. No. 5,232,405 discloses a chopper rotor supporting a plurality of blade members which generate a tangential airflow from the feed opening to the discharge opening. EP-1,754,408 discloses a straw chopper having a rotor with a chopping section and a pair of outboard fans which draw in air axially through holes in the respective ends of the housing and expel the air radially though the discharge outlet.

Although the aforementioned approaches improve the ejection velocity of the chopped material, it comes at the cost of reduced chopping performance. This loss in performance is exacerbated by the continued demand for increased combine capacity.

EP-0,331,784 discloses a straw chopper having a central inlet opening and a pair of lateral ejection openings which are axially offset from the inlet openings. The blade members are shaped so as to convey the straw in a helical path from the inlet opening to the ejection openings whilst also chopping the straw. By offsetting the discharge outlet from the inlet opening the passage of the crop residue from inlet to outlet is effectively lengthened, said passage having an axial component which, and which subjects the material to an increased interaction with the knives, thereby improving the chopping performance. However, despite the improved chopping action and ejection speed, the increased path length of the processed material has been found to come at the cost of a substantial increase in the power consumption of the apparatus.

SUMMARY OF INVENTION

In accordance with the invention there is provided apparatus for chopping and discharging crop residue from a combine harvester, the apparatus comprising a rotor supporting a plurality of chopping elements and a rotor housing comprising an inlet opening, a first outlet axially aligned with the inlet opening, and a second outlet axially offset from the inlet opening.

It should be understood that the term "axially offset" is intended to mean displaced along the rotating axis of the rotor.

Advantageously, only a portion of the crop residue fed into the outlet is conveyed laterally to the axially-offset opening thus reducing the power consumption. The invention involves the recognition that the chopped material spread over a central swathe of the spread width behind the combine harvester need not be accelerated to the same extent as the material that is spread laterally outwardly. The provision of an additional outlet that is axially aligned with the inlet opening allows for a portion of the crop residue to be conveyed substantially tangentially with no axial conveyance.

The apparatus preferably comprises at least one guide vane mounted to the inside of the rotor housing in a zone between the inlet opening and the axially-offset outlet. In operation the chopping elements, or knives, interact with at least one guide vane to guide the straw via a spiral path from the inlet to the second outlet. The geometry and number of guide vanes thereby determines the axial progress of the crop residue through the chopper.

The chopping elements may have a construction which imparts an axial force on a portion of the crop residue so as to propel the material axially as well as tangentially.

The inlet opening is preferably disposed in an upper region of the rotor housing with respect to the combine harvester so that the straw may be gravity fed from above.

The outlets are preferably disposed in a lower rear quadrant region of the rotor housing with respect to the forward direction of travel of the combine harvester. The outlet is both axially and circumferentially offset with respect to the inlet. In this case, the rotor rotates in a direction so that the chopping elements move towards the rear along a lower portion of their path (clockwise when viewed from the right hand side of the machine). In such an arrangement the inlet opening may be disposed generally centrally along a transverse axis with respect to the combine harvester. A first portion of the crop residue is conveyed in an arcuate path to the first outlet whilst a second portion is directed axially outwardly on two respective spiral or helical paths to the respective second and third discharge outlets. Advantageously, this arrangement allows for a wider spreading pattern wherein the chopped residue can be spread with a more sideways direction to both sides. Moreover, a chopper with a central inlet opening is better suited for simple installation on a combine harvester.

The apparatus may optionally comprises air vane elements mounted to the rotor in an acceleration zone axially proximate to the axially-offset outlet or outlets. The air vanes may take various different forms but may for example comprise a paddle which imparts a tangential force to the air and/or to the chopped residue. Alternatively, or in addition to, knives mounted to the rotor may include a bent portion which serves as an air vane element.

In a preferred arrangement, therefore, the rotor includes a generally central chopping zone, with respect to the axis of the rotor, the chopping zone having a plurality of chopping elements or knives mounted thereto, and acceleration zones disposed transversely outwardly of the chopping zone and each having a plurality of air vane elements mounted thereto for generating a propelling air flow directed through the axially-offset outlets and for spreading the chopped residue in a wide spread pattern.

BRIEF DESCRIPTION OF DRAWINGS

Further advantages of the invention will become apparent from reading the following description of specific embodiments with reference to the appended drawings in which.

In the drawings like characters of reference indicate corresponding parts in the different figures. Relative terms such as front, rear, longitudinal and transverse will be made with reference to the forward direction of travel of a combine harvester which embodies the chopping and discharging apparatus described.

DETAILED DESCRIPTION OF SPECIFIC EMBODIMENTS

Figure 1:
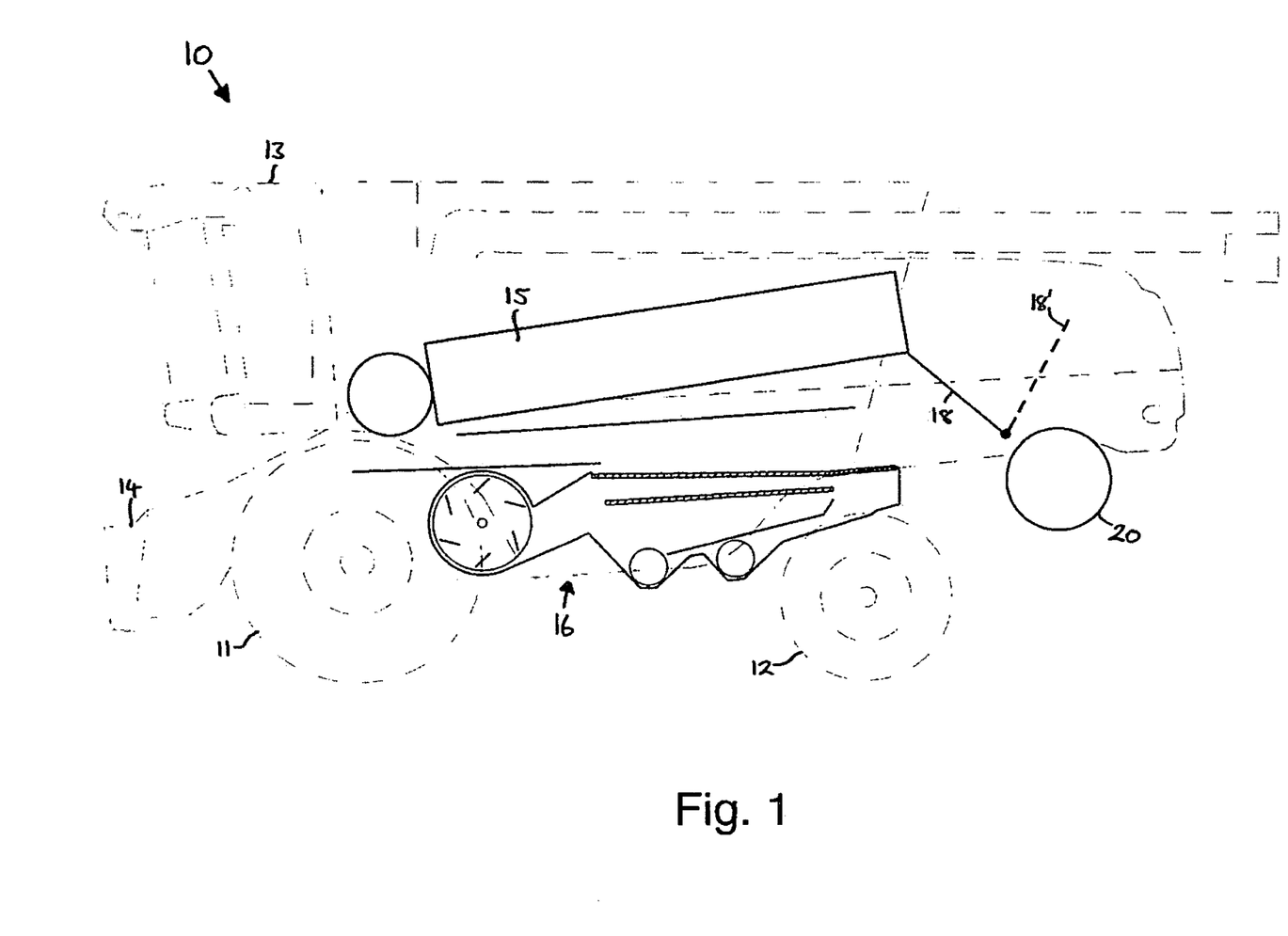
FIG. 1 is a schematic side view of a combine harvester embodying apparatus in accordance with the invention.

FIG. 1 shows in ghost form the outline of a combine harvester 10 having front wheels 11, rear wheels 12 and a driver's cab 13. At the front of the machine a feederhouse 14 has, in operation, mounted thereto a cutting header (not shown), the feederhouse collecting cut crop and conveying by known means into threshing and separating apparatus designated generally at 15. The separating apparatus may, for example, comprise a set of straw-walkers or one or more axial-flow rotors aligned longitudinally.

Grain and husks separated during the threshing and separating process fall by gravity into a cleaning system, designated generally at 16, in a known manner. The crop or plant residue, hereinafter referenced as 'straw', is ejecting from the rear of the separating apparatus 15. From here the straw is either directed by a diverter plate 18 into a straw chopper 20 or conveyed directly onto the ground to form windrows for subsequent baling. Diverter plate 18 is showed in solid line in FIG. 1 in a configuration which directs the straw into the chopper 20 and a dashed line 18' corresponding to the windrowing configuration.

Reference will now be made to FIGS. 2 to 9 which describe in detail an embodiment of the invention. Apparatus 20 includes a rotor 22 supported for rotation within a generally cylindrical rotor housing 24. Rotor 22 includes a rotor shaft 25 supported at each end by respective bearings 26 which are secured to the frame of the combine 10. It should be understood that the rotor 22 is supported for rotation on a transverse axis coaxial with shaft 25 located generally rearward and below the bottom edge of diverter plate 18.

Rotor housing 24 is generally cylindrical in shape having a tube portion 23a and two end walls 23b which are aligned with and attached to the side sheeting of the combine (not shown). A lower portion of the tube portion 23a provides a trough. It will of course be appreciated that rotor housing 24 may not necessarily be cylindrical in shape but will have a major axis that extends transversely with respect to the combine and is substantially parallel with the rotation axis of the rotor. Furthermore, the rotor housing 24 may form an integral part of a complex structure which may also include baffle plates, shielding or general structure to guide the straw either upstream or downstream of the chopper 20.

Figure 4:
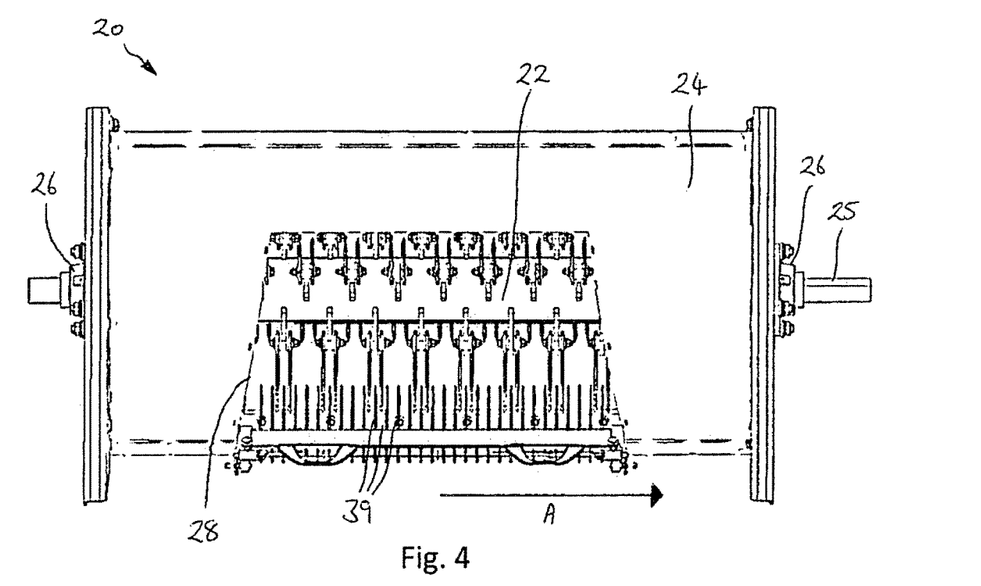
FIG. 4 is a top view of the straw chopper of FIG. 2, shown with the tailboard omitted.

Best seen in FIG. 4, a generally trapezium shaped cut-out in the housing 24 located intermediate the longitudinal ends defines an inlet opening 28 into which the straw is fed from above. The inlet opening 28 may take other forms, for example rectangular or triangular, or may indeed be smaller or larger than that shown, the geometry being determined at least in part by the capacity of the combine for example. A shroud or funnel 29 (shown in part in FIGS. 2 and 4) may be provided around the outside of the inlet opening 28 to direct the straw into the inlet 28 from above without loss.

The inlet opening 28 has a width 'W', with respect to the forward direction of the combine 10, that extends only a fraction of the length 'L' of housing 24. The inlet opening 28 of the illustrated embodiment has a width that is approximately one-half of the length of the housing 24. However, it should be appreciated that this fraction may be greater than or less than illustrated, and may depend upon the configuration of the separating apparatus 15 for example.

The housing 24 further comprises three outlets 30,31,32 formed by cut-out sections, and each having an attached spout 33,34,35 for directing discharged material in a generally rearward direction. A first outlet 30, with associated spout 33, is axially aligned with the inlet opening 28, and as such is centrally-aligned when viewed from the rear of the combine 10. In other words, the first outlet 30 is circumferentially-offset from the inlet opening 28 so that a portion of straw passing therebetween follows a predominantly circumferential path inside the housing 24. The circumferential offset direction is represented by arrow C in FIG. 9.

The second and third outlets 31,32, hereinafter referenced "outboard outlets" are axially and circumferentially offset (or displaced) from the inlet opening 28, with respect to the rotor axis. The axial offset direction is represented by arrow A in FIG. 4. There may be an axial overlap between the inlet opening 24 and the outboard outlets 31,32. In any case, a portion of the straw fed into the inlet opening 28 must shift in the axial direction on its path to the outboard outlets 31,32.

Figure 10:
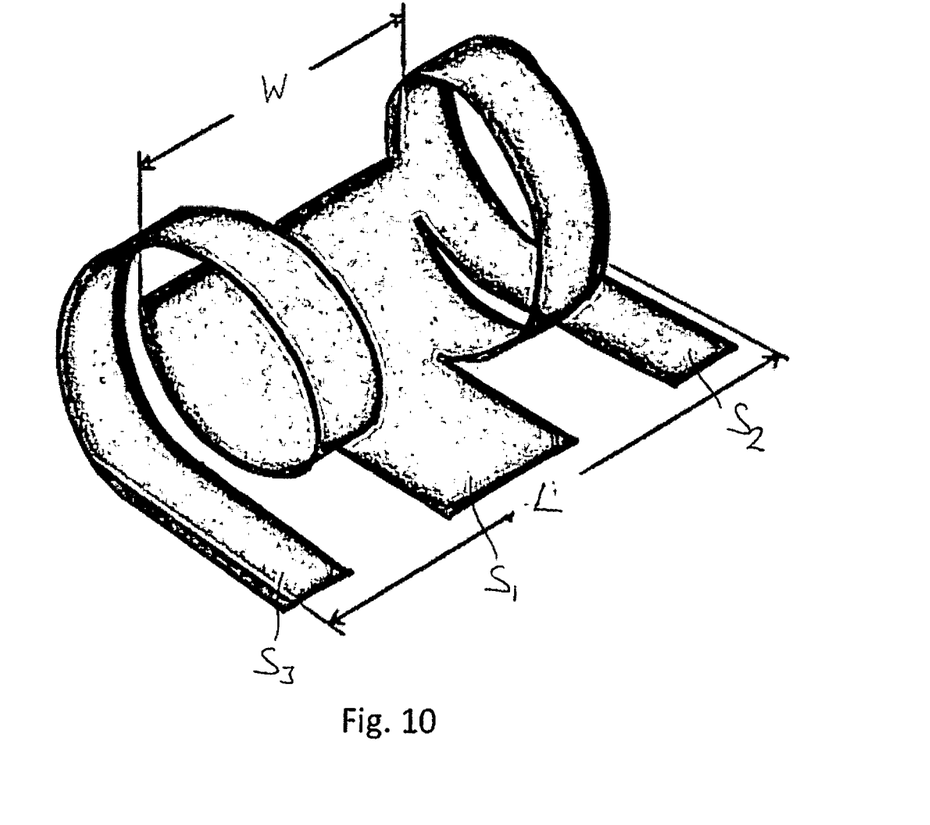

The straw fed into inlet 28 is, in fact, divided into three streams which are conveyed to the three outlets 30,31,32. With reference to FIG. 10, a first stream $S_1$ is conveyed tangentially from the inlet opening 28 to the first outlet 30. Second and third streams $S_2$, $S_3$, are conveyed in two respective helical paths to the outboard outlets 31,32 from where it is ejected by means to be described below.

Figure 5:
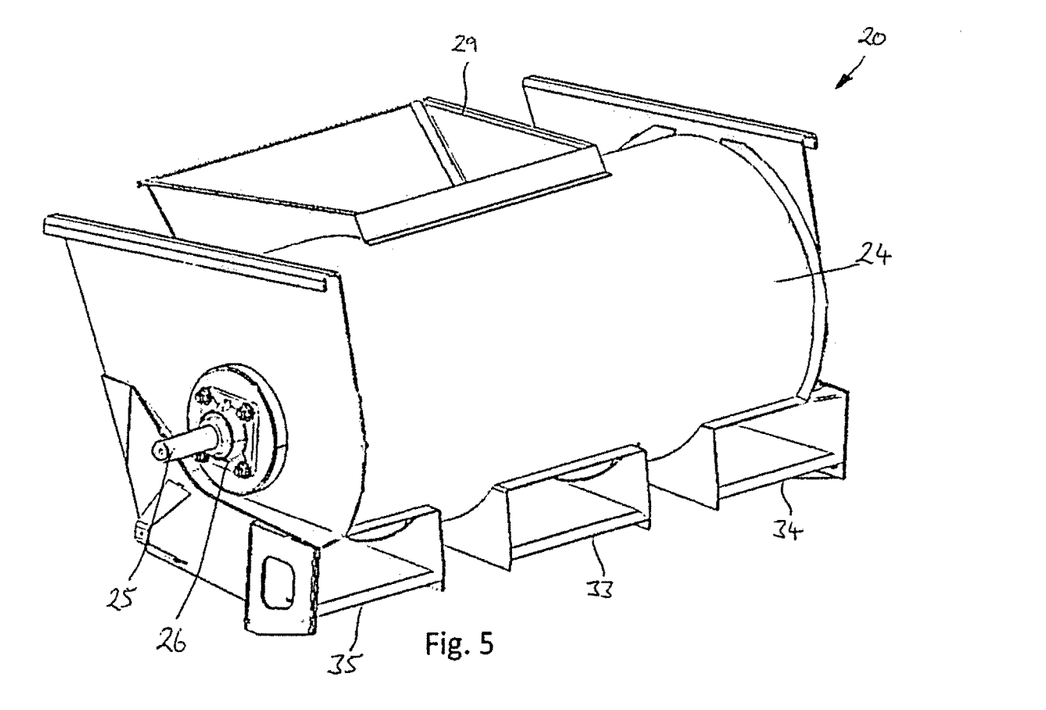
FIG. 5 is a rear left upper perspective view of the straw chopper of FIG. 2 shown with the tailboard removed.

Rotor 22 extends transversely, or width-wise with respect to the combine, and includes a central chopping zone $Z_1$ and two, outer, acceleration zones $Z_2,Z_3$, shown in FIG. 5. In the chopping zone $Z_1$ a plurality of chopping elements are mounted to the rotor 22. Best seen in FIGS. 7 and 8 clevises 36 secured by welding to the rotor 22 serve to support a pair of blades 38 fixed thereto by a bolt 40 inserted through a hole 42 in the clevis 36. It will be appreciated that blades 38 are mounted to the clevis 36 in a pendulous manner wherein the blades are free to pivot around bolt 40.

A bank of plural counterknives 39 are mounted to the front side of housing 24 in a mutually spaced relationship and extend into the swept envelope of the rotor blades 38. The pendulous rotor blades 38 during rotation pass between the counterknives 39 and, together, serve to chop the straw. Although shown as extending across the entire width of the housing 24, it is envisaged that only a part of the width may accommodate counterknives, for example in the chopping zone $Z_1$ only. Alternatively, the counterknives may be omitted altogether.

Figure 7:
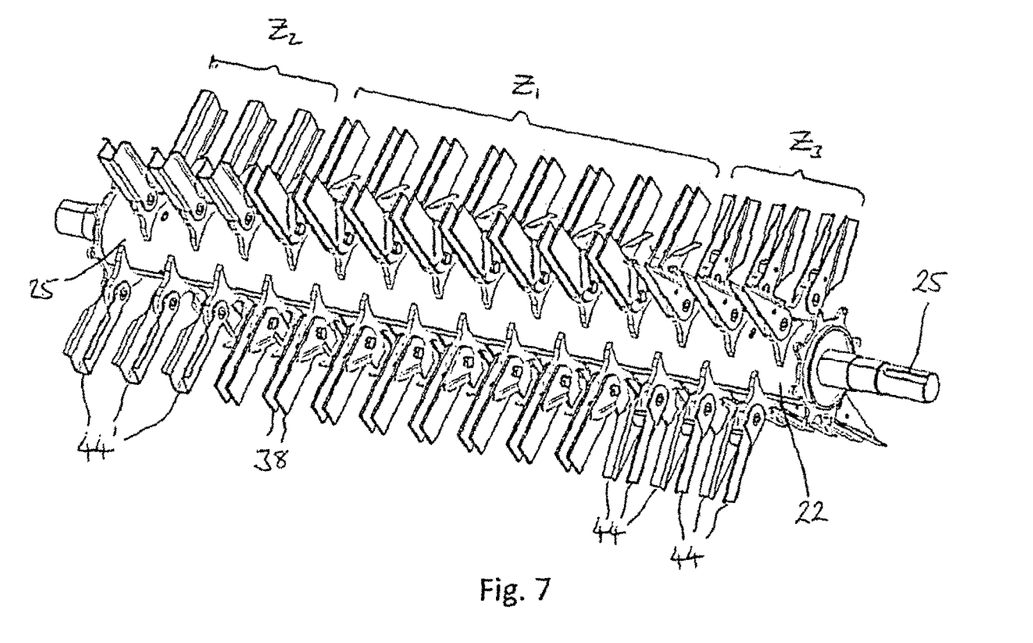
FIG. 7 is a top left front perspective view of the chopping rotor of the straw chopper of FIG. 2.
Figure 8:
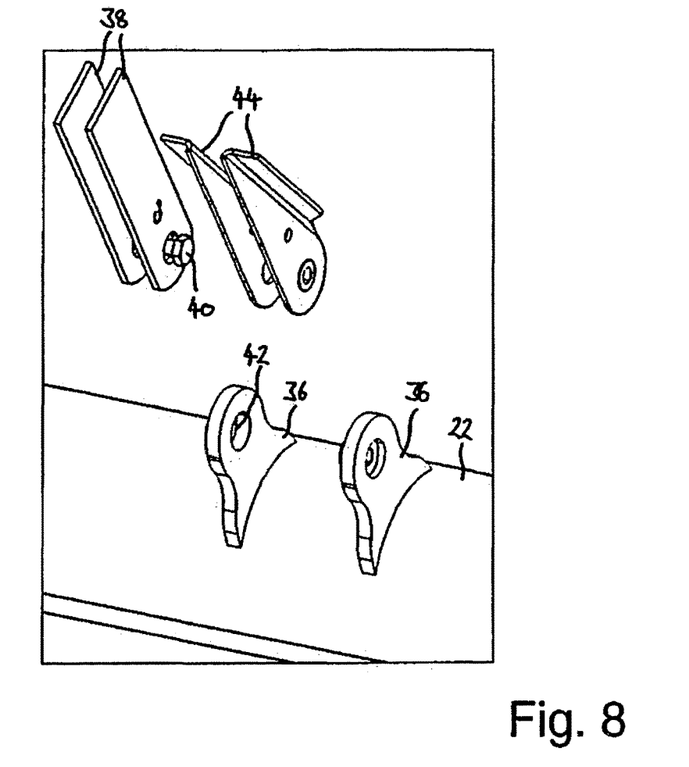
FIG. 8 is an enlarged view of part of the rotor of FIG. 5 showing one knife and air vane element in exploded form.

In each acceleration zone $Z_2,Z_3$, air vane elements 44 are bolted in a similar fashion to clevises provided in the acceleration zone. FIG. 7 shows air vane elements 44 in the left hand acceleration zone $Z_3$ being different to those air vane elements 44' in the right hand acceleration zone $Z_2$. However it should be understood that the difference in air vane elements is merely to illustrate that different forms of air vane element are conceivable and that those employed on a single rotor will typically be of the same construction for both ends.

Although inclusion is preferred, it is envisaged that the air vane elements can be omitted without deviating from the scope of the invention. Moreover, the chopping blades 38 could be omitted if relying on stationary knives mounted to the housing 24 to provide the chopping action.

Figure 9:
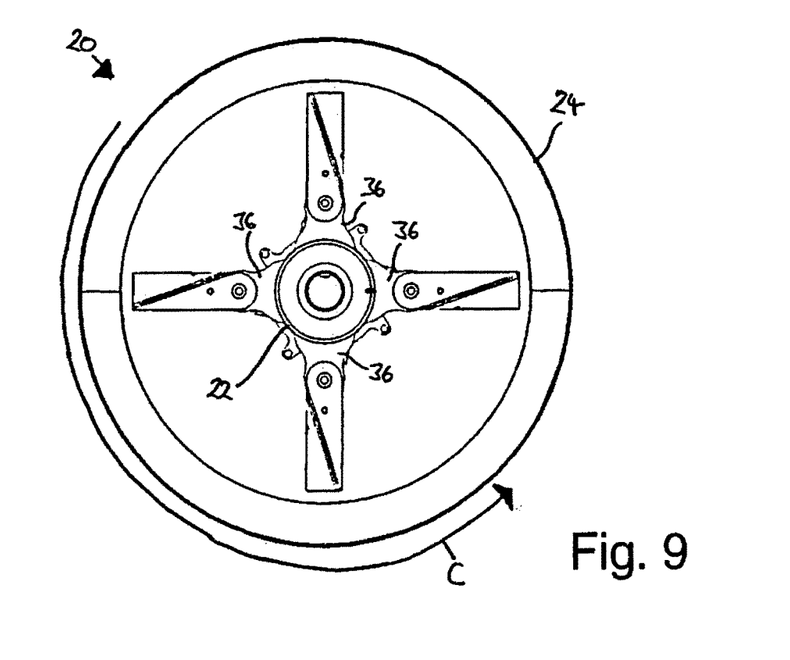
FIG. 9 is an end-on view of the straw chopper of FIG. 2 with the end wall removed to reveal the rotor; and, FIG. 10 shows, in diagrammatic form, the flow of material through the straw chopper of FIG. 2.

It can be seen from FIGS. 7 and 9 that the clevises 36 are arranged in four axially-extending rows separated by 90 degrees thereby providing four banks of knives and air vanes. However it should be appreciated that the clevises and associated chopping and air vane elements can be arranged in alternative patterns such as spiral rows.

Figure 6:
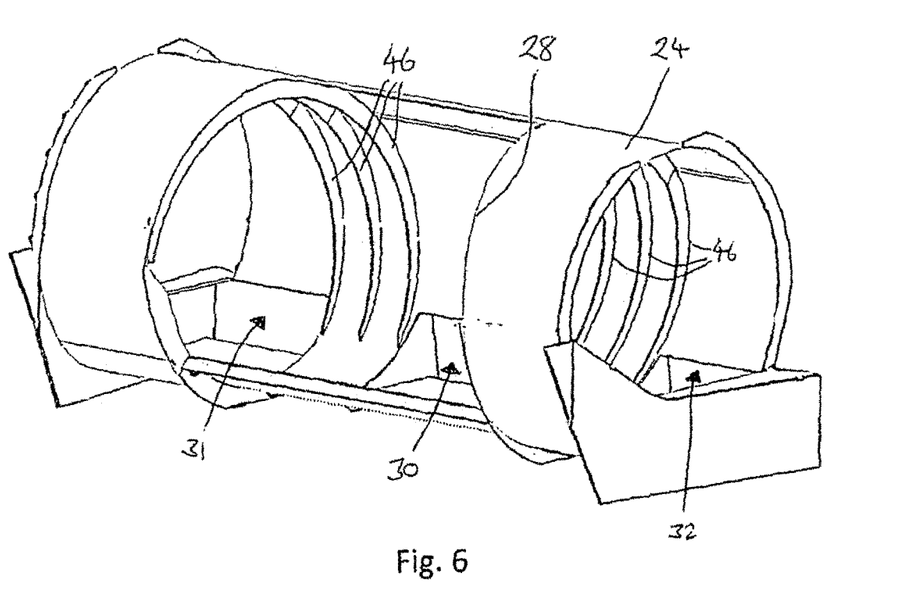
FIG. 6 is a top left front perspective view of the housing and guide vanes of the straw chopper of FIG. 2.

With specific reference to FIG. 6 a plurality of guide vanes 46 are provided on the inside surface of housing 24 axially outwardly of the inlet opening 28 and of the central outlet 30. Each guide vane 46 is arcuate and is angled axially outwardly in the direction of rotation of the rotor. It should be appreciated that more or less guide vanes than shown may be employed and may be continuous around the circumference of the housing 24 forming a spiral geometry. In one preferred example arrangement the guide vanes have a radial dimension in the order of 50 mm.

In operation straw is fed from above into the inlet 28 whereupon it is impacted by the knives 38 in the chopping zone $Z_1$. A central portion of the straw does not encounter the guide vanes 46 and is conveyed and chopped on a tangential path under the rotor before being ejected as first stream $S_1$ through central outlet 30.

The remaining straw is engaged by the guide vanes 46 in cooperation with the knives 38. The guide vanes 46 serve to divide outer streams $S_2,S_3$ away from the first stream $S_1$ and convey these streams $S_2,S_3$ in a spiral path outwardly, as illustrated in FIG. 10. The straw in streams $S_2,S_3$ is conveyed around one or more revolutions of the housing 24. When the respective streams $S_2,S_3$ reach the acceleration zones $Z_2,Z_3$ the material is ejected at speed through the outboard outlets 31,32 propelled by an accelerating air stream generated by air vane elements 44.

The accelerating airstream is fed with air drawn in from the inlet opening 28. A portion of the airflow through the chopper apparatus 20 is, therefore, generally axial thus assisting the passage of the straw. It is envisaged that extra air vents (not shown) may be provided if needed to deliver the necessary accelerating airstream. For example, extra vents may be provided in the end walls 23b.

The outlet spouts 33,34,35 are shaped so as to conform with the profile of housing 24 and to serve to direct the streams $S_1,S_2,S_3$ from the outlets 30,31,32 in a generally rear-facing direction through respective laterally-offset rectangular openings.

Figure 2:
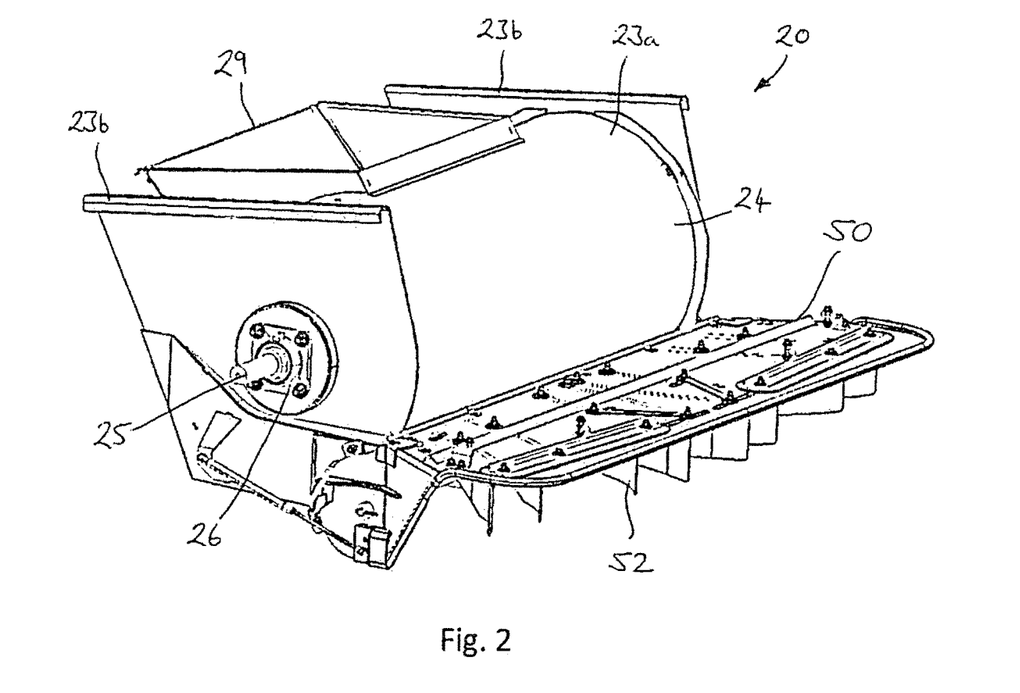
FIG. 2 is a perspective view from a rear-left-upper viewpoint of a straw chopper in accordance with a first embodiment of the invention.
Figure 3:
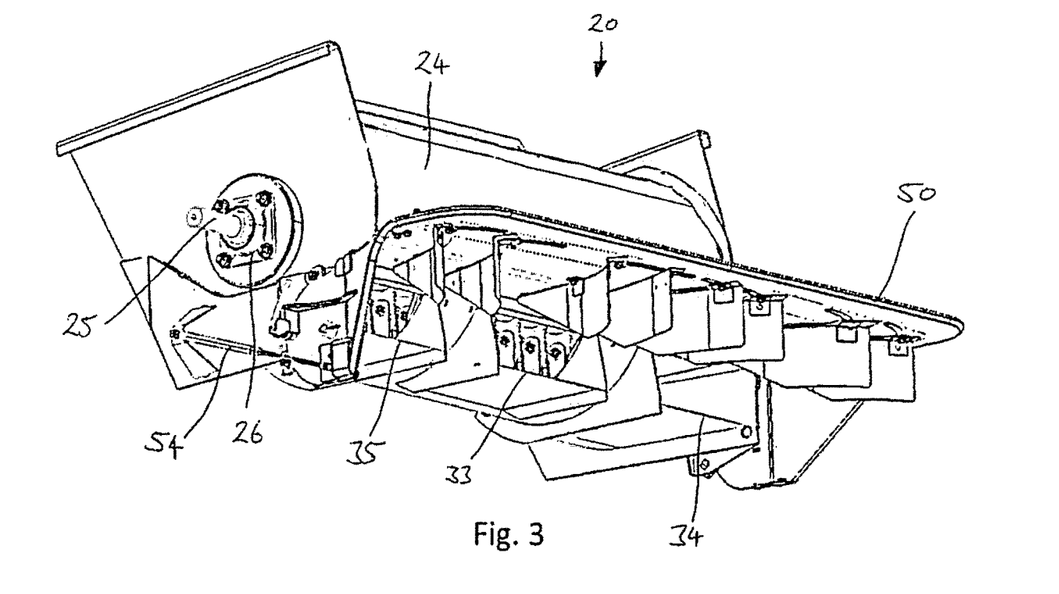
FIG. 3 is a perspective view from a rear-left-lower viewpoint of the straw chopper of FIG. 2.

Due to the accelerating action of the chopper 24, the straw is ejected at a speed which may render the use of an active straw spreader unnecessary. As shown in FIGS. 2 and 3, a passive straw spreading tailboard 50 may be provided, the tailboard 50 comprising directional vanes 52 secured to the underside thereof. The vanes 52 may be pivotally mounted to the tailboard 50 so as to allow adjustment of the lateral distribution of the ejected material. Furthermore, the tailboard 50 may optionally be pivotally mounted to the chopper housing 24 to permit the pitch to be adjusted around a transverse axis that is parallel to the rotor 22. As shown, a pneumatic cylinder 54 may be provided to control the pitch of the tailboard 50.

Depending on the configuration of the air vane elements 44, the discharge spouts 33,34,35 and/or the spreading vanes 52, the distance and speed at which central stream $S_1$ is projected may be considerably less than that of the outboard streams $S_2$ and $S_3$. Advantageously, the power consumption is optimised by accelerating and thus projecting only those portions of the straw material that need spreading laterally.

Although described as having three outlets, it is envisaged that the chopper 20 may comprise more outlets, for example five outlets with one axially aligned with the inlet opening and four axially offset from the inlet opening, wherein the outlets are preferably spaced laterally side-by-side. It is also envisaged that the chopper may comprise only two outlets with one axially aligned with the inlet opening and the other axially offset from the inlet opening.

In summary there is provided a straw chopper for a combine harvester comprises a rotor supporting a plurality of chopping elements. A rotor housing comprises an inlet opening, an outlet axially aligned with the inlet opening, and at least one outlet that is axially offset from the inlet opening. A portion of the straw is conveyed tangentially to the axially-aligned outlet, whilst a further portion is conveyed from the inlet opening to the axially offset outlet(s) via a path having an axial component, for example a helical path. Guide vanes may be provided on the inside of the housing to impart an axial force upon the straw.

The invention claimed is:

1. An apparatus for chopping and discharging crop residue, the apparatus comprising:
   a rotor comprising a plurality of chopping elements, the rotor rotatable about an axis; and a rotor housing comprising a tube structure, a first end wall at one end of the tube structure and a second end wall at an opposite end of the tube structure, the rotor housing further comprising:
- an inlet opening formed in the tube structure;
- a first outlet formed in the tube structure of the rotor housing having a first discharge spout through which a first portion of the crop residue is discharged from the rotor housing, wherein the first outlet is axially aligned along the axis with the inlet opening; and
- a second outlet formed in the tube structure of the rotor housing having a second discharge spout through which a second portion of the crop residue is discharged from the rotor housing, wherein the second outlet is axially offset along the axis from the inlet opening such that the second outlet and second discharge spout are separated from the first outlet and first discharge spout by a portion of the tube structure of the rotor housing.

2. The apparatus according to claim 1, further comprising at least one guide vane mounted to an interior surface of the rotor housing between the inlet opening and the second outlet, wherein, the chopping elements are configured to interact with the at least one guide vane to direct crop residue in a helical path.

3. The apparatus according to claim 1, wherein the inlet opening is disposed located in an upper region of the rotor housing.

4. The apparatus according to claim 3, wherein the first and second outlets are located in a lower rear quadrant of the rotor housing and wherein the rotor rotates in a direction wherein the chopping elements move towards the rear along a lower portion of their path.

5. The apparatus according to any preceding claim 1, wherein the inlet opening is limited in width to a portion of the rotor length of the rotor.

6. The apparatus according to claim 1, further comprising a third outlet formed in the tube structure of the rotor housing having a third discharge spout through which a third portion of the crop residue is discharged from the rotor housing, wherein the third outlet is axially offset along the axis from the inlet opening, wherein the inlet opening is located axially intermediate the first and second end walls, wherein the second and third outlets are offset in the axial direction to either side of the inlet opening and the first outlet such that the third outlet and third discharge spout are separate from the first outlet and first discharge spout by a portion of the tube structure of the rotor housing and the second outlet and second discharge spout by a portion of the tube structure of the rotor housing.

7. The apparatus according to claim 6, wherein the inlet opening and the first outlet are disposed centrally located with respect to the rotor length.

8. The apparatus according to claim 6, wherein the first, second and third outlets are each laterally offset from one another.

9. The apparatus according to claim 1, further comprising air vane elements mounted to the rotor in an acceleration zone axially proximate to the second and/or third outlets.

10. The apparatus according to claim 9, wherein the acceleration zone is devoid of chopping elements.

11. The apparatus according to claim 1, wherein the inlet opening is trapezium-shaped.

12. The apparatus according to claim 1, wherein the tube structure of the rotor housing is cylindrical.

13. The apparatus apparatus according to claim 1, further comprising a passive tailboard which has directional vanes attached thereto, wherein the directional vanes are located downstream of the first and second outlets and configured to direct discharge laterally.

14. A combine harvester comprising the apparatus according to claim 1.

15. The combine harvester according to claim 14, further comprising:
- a grain separating apparatus having a straw ejection zone located above the rotor housing; and
- a shroud configured to funnel crop residue from the straw ejection zone into the inlet opening.

* * * * *